(12) United States Patent
Mcbride et al.

(10) Patent No.: US 6,268,219 B1
(45) Date of Patent: Jul. 31, 2001

(54) METHOD AND APPARATUS FOR DISTRIBUTING FLUID IN A MICROFLUIDIC DEVICE

(75) Inventors: Sterling Eduard Mcbride, Lawrenceville; Richard Morgan Moroney, III, Princeton, both of NJ (US)

(73) Assignee: Orchid BioSciences, Inc., Princeton, NJ (US)

( * ) Notice: Subject to any disclaimer, the term of this patent is extended or adjusted under 35 U.S.C. 154(b) by 0 days.

(21) Appl. No.: 09/349,550

(22) Filed: Jul. 9, 1999

(51) Int. Cl.[7] .................................................... B01L 3/00
(52) U.S. Cl. ........................ 436/180; 422/100; 422/102
(58) Field of Search ............................... 422/61, 58, 102, 422/100; 436/180

(56) References Cited

U.S. PATENT DOCUMENTS

| 4,271,119 | | 6/1981 | Columbus . |
|---|---|---|---|
| 5,585,069 | * | 12/1996 | Zanzucchi et al. . |
| 5,716,852 | | 2/1998 | Yager . |
| 5,759,370 | | 6/1998 | Pawliszyn . |
| 5,772,903 | | 6/1998 | Hirsch . |
| 5,798,042 | | 8/1998 | Chu . |
| 5,992,820 | * | 11/1999 | Fare et al. . |
| 6,033,544 | * | 3/2000 | Demers et al. . |
| 6,106,685 | * | 8/2000 | McBride et al. . |

* cited by examiner

*Primary Examiner*—Jan Ludlow
(74) *Attorney, Agent, or Firm*—Artz & Artz, P.C.

(57) ABSTRACT

A fluid distribution system has a microfluidic device that has a main channel with a plurality of branches extending therefrom. The main channel has a length. The main channel and the branches are coupled through a plurality of apertures with aperture diameters. The aperture diameters progressively increase along said length of the main channel to allow fluid to more evenly be distributed to the branches.

9 Claims, 2 Drawing Sheets

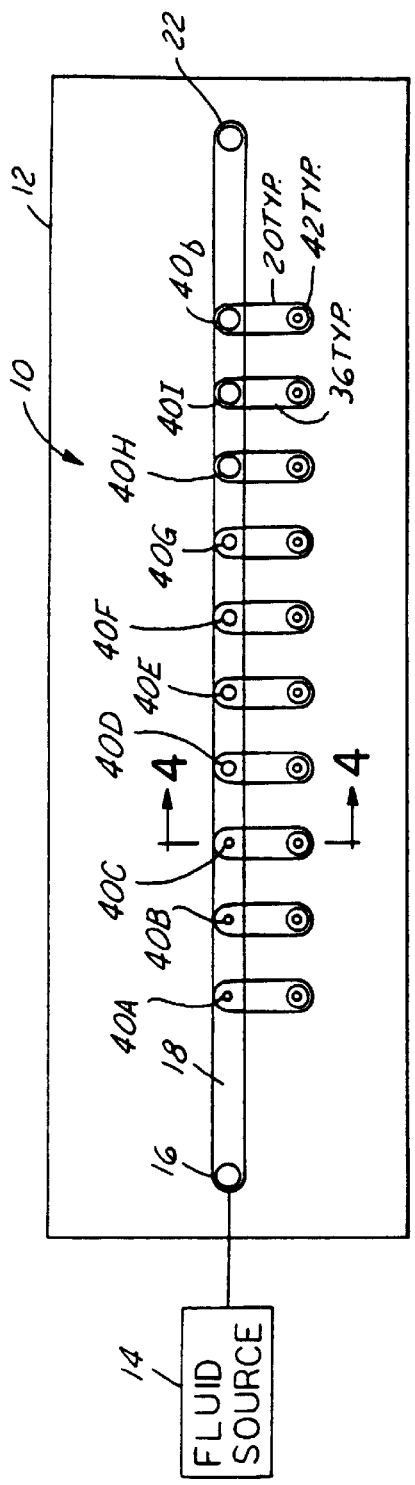
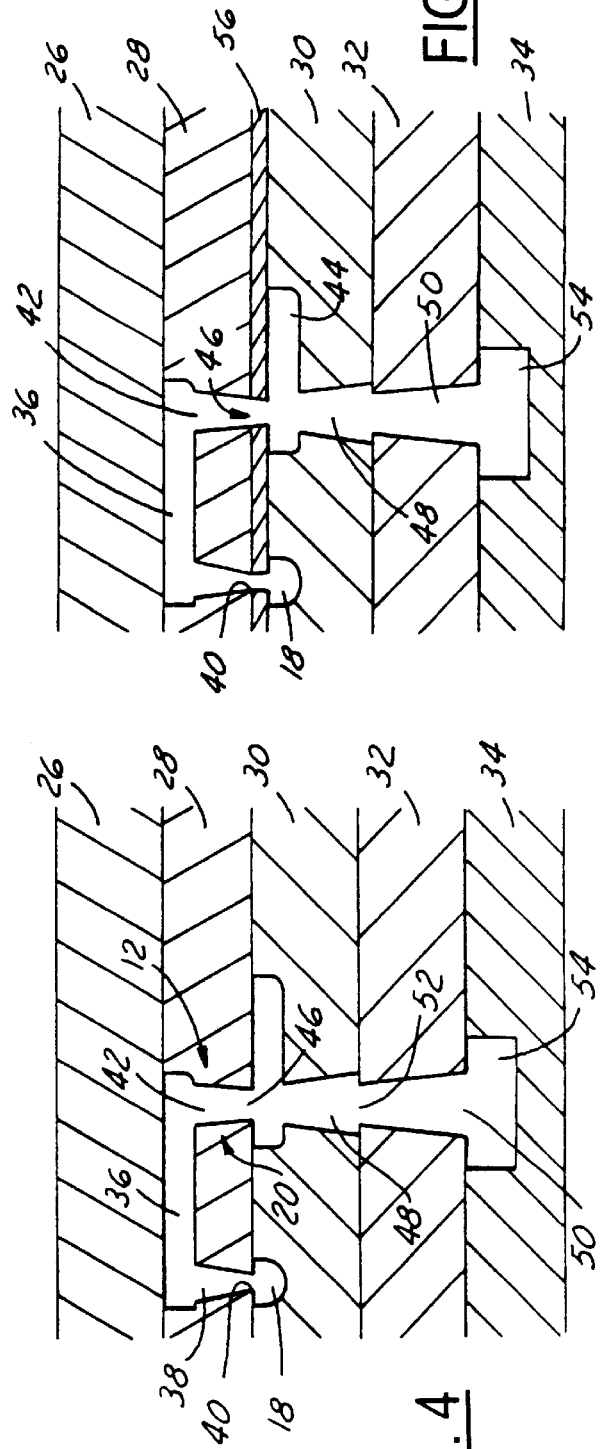

METHOD AND APPARATUS FOR DISTRIBUTING FLUID IN A MICROFLUIDIC DEVICE

TECHNICAL FIELD

The present invention relates to microfluidic devices, and more particularly, to a method and apparatus for distributing fluid on a microfluidic device.

BACKGROUND OF THE INVENTION

Methods of making a homologous series of compounds, or the testing of new potential drug compounds comprising a series of light compounds, has been a slow process because each member of a series or each potential drug must be made individually and tested individually. For example, a plurality of potential drug compounds is tested by an agent to test a plurality of materials that differ perhaps only by a single amino acid or nucleotide base, or a different sequence of amino acids or nucleotides.

The processes described above have been improved by microfluidic chips which are able to separate materials in a micro channel and move the materials through the micro channel is possible. Moving the materials through micro channels is possible by use of various electro-kinetic processes such as electrophoresis or electro-osmosis. Fluids may be propelled through various small channels by the electro-osmotic forces. An electro-osmotic force is built up in the channel via surface charge buildup by means of an external voltage that can repel fluid and cause flow.

In fluid delivery in microfluidic structures, it is important to distribute approximately the same fluid volume to each reaction well. By using certain fluids, however, even distribution to the various reaction wells is difficult to accomplish. This is especially true in pressure pumping. Pressure pumping uses pressurized fluid at the fluid input. The fluid under pressure is distributed along the channels and ultimately to reaction wells. One problem associated with pressure pumping is that fluid closer to the input is under higher pressure than the fluid further downstream due to the pressure losses associated with each of the branches. This in time allows the channels closer to the fluid input to fill more rapidly.

SUMMARY OF THE INVENTION

It is, therefore, one object of the invention to provide an improved fluid delivery mechanism to an array of reaction wells. It is a further object of the invention to provide a reliable method for delivering fluid to reaction wells.

It is another object of the present invention to create a relatively small device which can carry out hundreds and even thousands of chemical experiments simultaneously, create new compounds, and measure their reactivities.

It is yet another object of the present invention to provide a liquid handling drug discovery and diagnostic tool which increases the speed and productivity of discovering new drug candidates and does so on a miniaturized scale or platform that reduces cost and manual handling. It is still a further object of the present invention to provide a multiple fluid sample processor, system and method which is capable of conveying, transporting, and/or processing samples in a large multiplicity of sites without exposure to the atmosphere.

In one aspect of the invention, a fluid distribution system has a microfluidic device that has a main channel therein. The microfluidic device has a plurality of branches extending therefrom. The main channel has a length. The main channel and the branches are coupled through a plurality of apertures with aperture diameters. The apertures progressively increase along said length of the main channel.

One advantage of the invention is that small and controlled amounts of fluid may be delivered in an array structure with micro channels that have high pressure losses.

Other objects and features of the present invention will become apparent when viewed in light of the detailed description of the preferred embodiment when taken in conjunction with the attached drawings and appended claims.

BRIEF DESCRIPTION IF THE DRAWINGS

FIG. 3 is a schematic view of a fluid distribution system network formed according to the present invention.

FIG. 4 is a cross-sectional view along line 4—4 of FIG. 1.

FIG. 5 is a cross-sectional view of an alternative embodiment of a fluid distribution network as shown in FIGS. 3 and 4.

DETAILED DESCRIPTION OF THE PREFERRED EMBODIMENT

Figure 1:
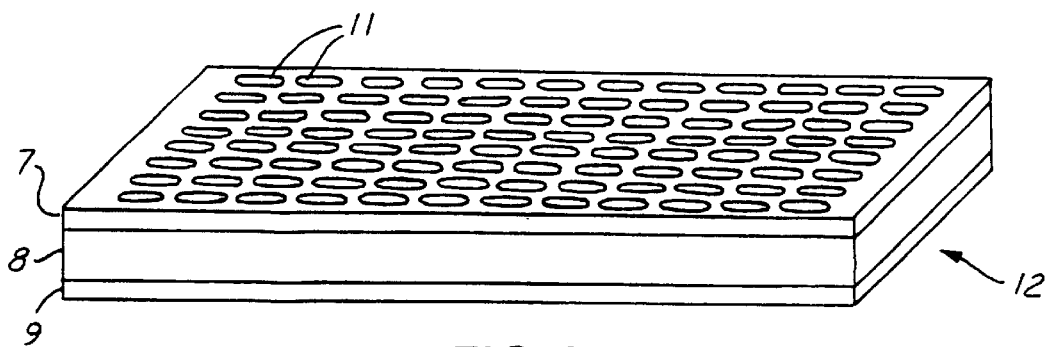
FIG. 1 illustrates a multiple fluid sample processor according to the present invention.

Referring now to the drawings, like reference numerals are used to identify identical components in the various views. The present invention can be used particularly in the industrialization of drug discovery processes. The present invention increases speed and productivity while providing researchers with expended capabilities and assuring quality. The invention provides substantial time and efficiency advantages over prior techniques. The invention provides miniaturized liquid handling systems which perform the biological, chemical and the analytical processes fundamental to life sciences, research and development. The invention can be utilized to perform thousands of reactions simultaneously in an integrated format, which substantially reduces the time, effort and expense required while improving the quality of the test results.

The processor in accordance with the present invention generally incorporates a modular configuration with distinct layers or plates. The processor or microfluidic device 12 is capable of conducting parallel synthesis of thousands of small molecule compounds through the precise delivery of reagents to discrete reaction sites. This helps create a significantly larger number and variety of small molecules more effectively and with fewer resources.

With the present invention, arrays of DNA can be synthesized on demands. The processor can also be used for high volume of sample processing and testing, as well as the search for new molecular targets and determining expression levels and response to known drugs. The processor can incorporate multiple assay formats, such as receptor binding, antibody-antigen interactions, DNA/RNA amplification and detection, as well as magnetic bead base separations. The versatility of the processor and its architecture make it available for use with synthesize work stations, genomic support stations, and analytical preparation systems.

Figure 2:
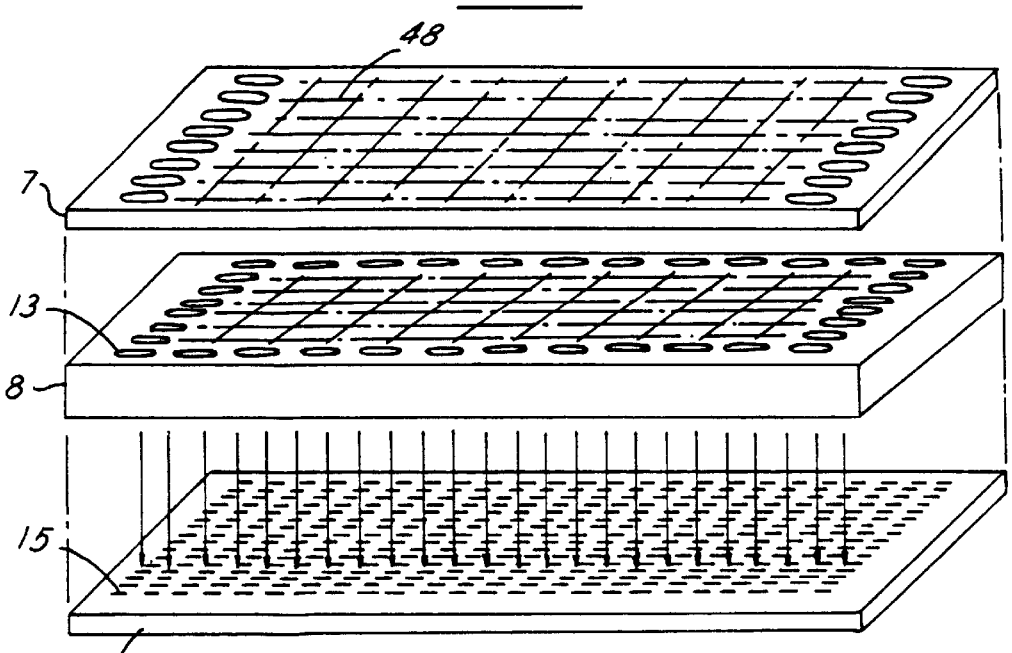
FIG. 2 is an exploded view of the processor shown in FIG. 1.

A basic multiple fluid sample processor or microfluidic device 12 in accordance with the present invention is shown in FIGS. 1 and 2, with cross-sections of the layers being shown in FIGS. 4 and 5. The microfluidic device is illustrated as a three-layered structure in the embodiment illustrated. The microfluidic device 12 is also called a fluid assay layered device (FALD), or a fluidic array.

The microfluidic device 12 includes a top layer 7, which is also called a reagent reservoir. The microfluidic device 12 also includes a middle layer or fluidic delivery layer 8, as well as a bottom layer or well plate 9.

The top layer 7 is also called a feed-through plate and serves as a cover for the microfluidic device 12. Layer 7 contains a number of apertures 11 which are selectively positioned immediately above apertures 13 in layer 8. Apertures 13 are connected by an elongated micro-channel 48 which in turn have a plurality of branches extending therefrom. As illustrated, layer 8 contains one layer, however, one skilled in the art would recognize that layer 8 may comprise several layers.

Well plate 9 has a plurality of wells 15 which are used to hold the reagents and other materials in order for them to react and synthesize.

The three layers 7, 8 and 9 are stacked together to form a modular configuration. They are also coupled together tightly to form a liquid-tight seal. If desired, the top layer 7 can be bounded or fused to the center distribution plate 8 or layer. The bottom or well plate layer 9, however, is detachably coupled to layer 8.

The plates 7, 8 and 9 may be made from any desirable material, such as glass, fused silica, quartz, or silicon wafer material. The reservoirs, micro-channels and reaction cells are controllably etched or otherwise formed onto the plates using traditional semi-conductor fabrication techniques with a suitable chemical etchant, laser drilling or reactive ion etching.

Top plate 7 contains apertures positioned above the openings 13 located in the central plate. These apertures provide the necessary openings for loading module to fill the reservoirs with a plurality of agents or other materials.

As will be further described below, a pressure pumping mechanism, is preferably used to assist in loading and distributing the reagents and other materials within the layers.

A typical need is for one of the sample plates to have each sample repeated conveyed, transported and/or processed while eventually being delivered into the well plate. During this time, the samples are typically exposed to the atmosphere and can oxidize, evaporate or cross-contaminate to an undesirable extent. With the present invention, however, the multi-layered sample microfluidic device 12 with detachable well plates inhibits cross-contamination of the fluids used in the combinatorial process.

The detachable layers in accordance with the present invention are preferably of a common dimensionality for ease of being handled by robotic or other automation means. A common set of dimensions has been adopted by many manufacturers which match that of the 96-well plate known as a "micro titer" plate.

Preferably, the plates 7, 8 and 9 are connected to each other by an indexing means of detents, flanges or locating pins so they are closely aligned in the horizontal and vertical directions. While engaged in such manner, samples from one of the plates can be caused to be moved and transported to another plate. Means for transporting or moving the samples from one of the plates to the other can be by pumping, draining, or capillary action. While the samples are engaged, and as a result of the transport of the samples from one layer to the other, the samples may be processed, reacted, separated, or otherwise modified by chemical or physical means, and then finalized by optical, electrochemical, chemical, or other means.

Samples or fluids can be delivered to the microfluidic device 12 by being contained in one of the members of physically engaging sample multi-well plates, such as a top layer 7, or other means of sample introduction can be utilized, such as through the edges of such layer.

Referring to FIG. 3, a microfluidic distribution system 10 is shown incorporated into a microfluidic device 12. A fluid source 14 provides reagents to microfluidic device 12.

Distribution system 10 has a fluid input 16 coupled to fluid source 14. Fluid input 16 is coupled to a main channel 18. Main channel 18 has a plurality of branches 20 extending therefrom. Main channel 18 is coupled to a fluid output 22 that directs fluid outside of microfluidic device 12, which has not been diverted by one of the plurality of branches 20.

Fluid source 14 is preferably a pressurized fluid source that provides pressurized fluid to main channel 18. Various types of pressurized fluid sources 14 would be evident to those skilled in the art. Two examples of pressurized fluid sources are disclosed in my copending commonly assigned patent applications entitled "Fluid Delivery System For A Microfluidic Device Using A Pressure Pulse," Ser. No. 09/351,206 filed Jul. 9, 1999, and "Fluid Delivery System For A Microfluidic Device Using Alternating Pressure Pulses," Ser. No. 09/349,438 filed Jul. 9, 1999, the subject matter of such copending applications being incorporated herein by reference.

Referring now also to FIG. 4, microfluidic device 12 is preferably comprised of a plurality of adjacent layers. In the present example, a top layer 26, a second layer 28, a third layer 30, a fourth layer 32, and a well layer 34 are used. The composition of each layer may, for example, be glass, silicon, or another suitable material known to those in the art. Each layer may be bonded or glued together in a manner known to those skilled in the art. For example, the layers may be anodically bonded.

Branches 20 provide interconnections to well layer 34 through the various layers 26 through 32. The various openings and channels forming branches 20 may be formed in a conventional manner, such as by etching or drilling. Drilling may be accomplished by laser or mechanical drilling.

Main channel 18 in the preferred embodiment is defined by third layer 30 and second layer 28. A cell feed 36 is formed between top layer 26 and within second layer 28. Cell feed 36 is coupled to main channel 18 through interlayer feed channel 38. Interlayer feed channel 38, as illustrated, is conical in shape. However, interlayer feed channel 38 may also be cylindrical in shape. Cell feed 36 has an extension 42 that extends to the edge of center layer 28 at the interface with third layer 30.

An air fluid manifold 44 is formed in third layer 30. Air fluid manifold 44 is fluidically coupled to extension 42. The interface between air fluid manifold 44 and extension 42 forms a capillary break 46. Fluid under pressure enters main channel 18 and fills cell feed 36 and extension 42 up to capillary break 46. Capillary break 46 must be overcome with a higher pressure than the initial fill pressure. Once the higher pressure is applied, fluid flows through manifold 44. Air fluid manifold 44 is coupled to the interface between third layer 30 and fourth layer 32 by a manifold channel 48. Manifold channel 48 is fluidically coupled to a well feed 50 that extends through fourth layer 32. In the preferred embodiment, a back flow valve 52 is formed at the interface between manifold channel 48 and well feed 50. Back flow valve 52 is formed by providing a larger diameter manifold channel 48 at the entrance to well feed 50. That is, the diameter of manifold channel 48 at fourth layer 32 is greater than the diameter of well feed 50.

Well layer 34 has a well 54 formed therein. Well feed 50 is fluidically coupled to well 54. Well layer 34 may be detachable from fourth layer 32.

Referring now to FIG. 5, a similar structure to that of FIG. 4 is shown, except a silicon layer 56 is interposed between second layer 28 and third layer 30. Silicon layer 56 may be doped to various levels to provide various electrical characteristics.

As is best shown in FIG. 3, the size of interlayer feed holes 40 varies as a function of the distance from fluid input. Preferably, the smallest diameter feed holes are located close to fluid input 16. The diameter is steadily increased along the length of main channel 18 toward fluid input 22. In one constructed device, main channel 18 had a 300 $\mu$m wide and 100 micrometers deep channel. Interlayer holes varied from 50 $\mu$m toward fluid input 16 and increased to a diameter of 150 $\mu$m.

In operation, pressurized fluid from fluid source 14 is introduced into main channel 18 at fluid input 16. As the fluid passes the first interlayer feed hole 40, fluid begins to fill interlayer feed channel 38 through interlayer feed hole 40. Fluid then enters cell feed 36 and extension 42 up to the capillary break. Each branch along the main channel is filled in a similar manner and relatively simultaneously. By varying the size of interlayer feed hole 40, the magnitude of the pressure loss associated with each branch may be somewhat balanced with the other feed holes. This allows each of the branches to be filled at the same rate.

While particular embodiments of the invention have been shown and described, numerous variations and alternate embodiments will occur to those skilled in the art. Accordingly, it is intended that the invention be limited only in terms of the appended claims.

What is claimed is:

1. A fluid distribution system comprising:
   a microfluidic device having a plurality of layers;
   a main channel within said microfluidic device having a plurality of branches extending therefrom, said main channel having a length;
   said main channel and said branches coupled through a plurality of apertures, each with a respective aperture diameter, said aperture diameters progressively increasing along said length,
   each of said plurality of branches comprises an interlayer channel extending substantially through one of said plurality of layers, said interlayer channel extending from said main channel through a respective one of said plurality of apertures, a cell feed directly fluidically coupled to said interlayer channel, and a capillary break directly fluidically coupled to said cell feed.

2. A fluid distribution system as recited in claim 1 further comprising a well feed fluidically coupled to said capillary break.

3. A fluid distribution system as recited in claim 1 further comprising a back flow valve coupled in series with said capillary break.

4. A fluid distribution system comprising:
   a microfluidic device having,
      a top layer;
      a second layer adjacent to the top layer;
      a third layer adjacent to the second layer;
      a fourth layer adjacent to the third layer and a well plate adjacent to the fourth layer,
   said microfluidic device having a main channel having a fluid inlet, said main channel defined between said second layer and said third layer, a plurality of cell feeds extending from said main channel through a respective one of a plurality of interlayer feed holes defined within said second layer, each of said feed holes having a respective feed hole diameter which is a function of the distance from said fluid input.

5. A fluid distribution system as recited in claim 4 wherein said apertures progressively increase as a function of the distance from said fluid input.

6. A fluid distribution system as recited in claim 4 further comprising a capillary break fluidically coupled to said cell feed.

7. A fluid distribution system as recited in claim 6 further comprising a well feed fluidically coupled to said capillary break.

8. A fluid distribution system as recited in claim 6 further comprising a back flow valve coupled in series with said a capillary break.

9. A method of distributing fluid comprising the steps of:
   pumping fluid into a channel of a microfluidic device, said microfluidic device having a main channel with a plurality of branches extending therefrom, each of said plurality of branches comprising an interlayer channel extending from said main channel through a respective one of said plurality of apertures, a cell feed directly fluidically coupled to said interlayer channel, and a capillary break directly fluidically coupled to said cell feed; and
   substantially uniformly distributing fluid to a plurality of branches through said plurality of apertures having increasing diameters corresponding to the distance from the fluid input.

* * * * *